United States Patent [19]

Moringiello et al.

[11] 4,337,982
[45] Jul. 6, 1982

[54] FRICTION DAMPER

[75] Inventors: Donald C. Moringiello, Windsor, Conn.; Stephen H. Dallmann, Minneapolis, Minn.

[73] Assignee: United Technologies Corporation, Hartford, Conn.

[21] Appl. No.: 215,301

[22] Filed: Dec. 11, 1980

[51] Int. Cl.³ .............................................. F16C 27/04
[52] U.S. Cl. ................................... 308/26; 308/184 A
[58] Field of Search ................. 308/26, 184 R, 184 A, 308/207 R, 207 A, 189 A

[56] References Cited

U.S. PATENT DOCUMENTS

| | | | |
|---|---|---|---|
| Re. 30,210 | 2/1980 | Buono et al. | 308/184 R |
| 3,756,672 | 9/1973 | Hibner et al. | 308/189 A |
| 4,214,796 | 7/1980 | Monzel et al. | 308/26 |
| 4,229,058 | 10/1980 | Arrowsmith et al. | 308/184 A |

Primary Examiner—Lenard A. Footland
Attorney, Agent, or Firm—Norman Friedland

[57] ABSTRACT

This invention relates to dampers for bearings supporting rotors of a gas turbine engine which includes frictionally juxtaposed discs that are supported by a spring that is in parallel relationship thereto.

3 Claims, 1 Drawing Figure

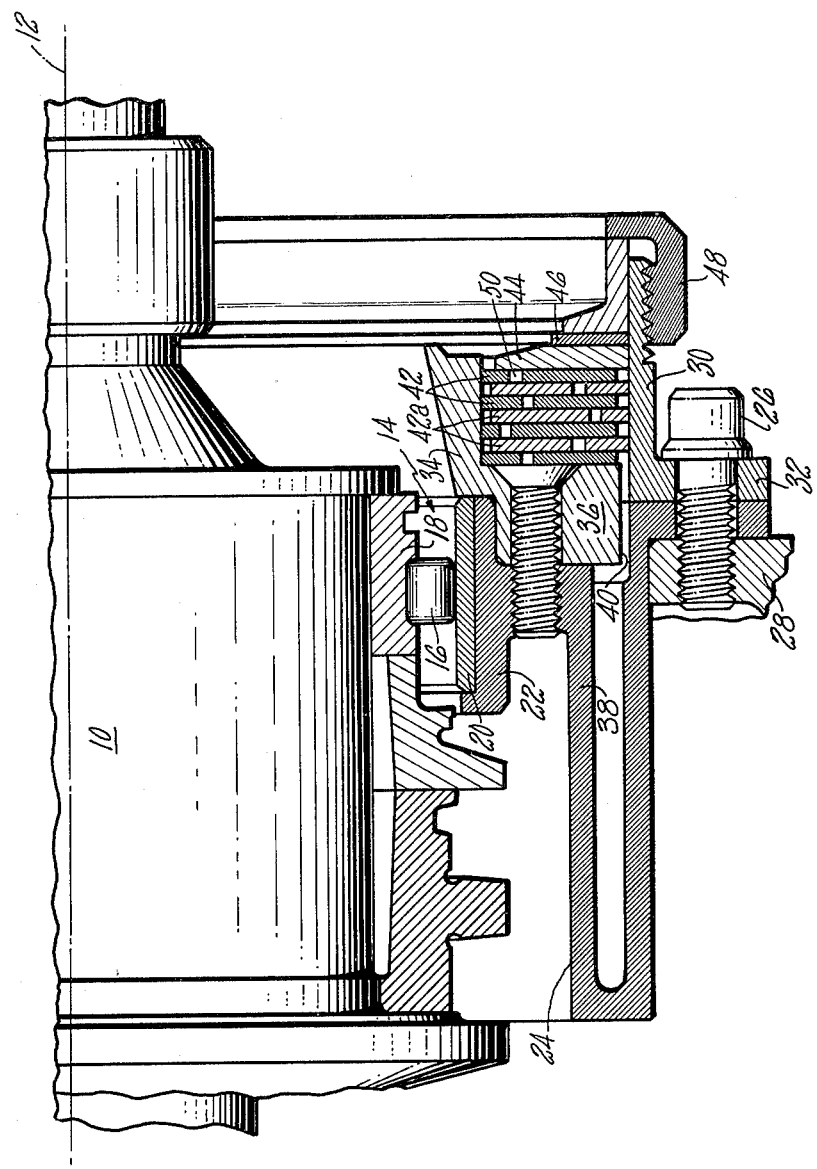

FRICTION DAMPER

CROSS REFERENCE

This patent application relates to the damper of the type disclosed in U.S. Patent Applications filed by D. H. Hibner and D. C. Moringiello, D. H. Hibner and M. D. Dulberger on even date and both entitled VISCOUS/FRICTION DAMPER and assigned to the same assignee as this patent application.

TECHNICAL FIELD

This invention relates to rotors and particularly dampers for absorbing the vibration induced by the unbalance of the rotor in the rotating mode.

BACKGROUND ART

As is well known, it is common practice to utilize dampers with bearings particularly for high speed jet engine rotors. The function of the dampers are to absorb energy to reduce vibration and stabilize the rotor. A damper that utilizes oil is described in U.S. Pat. No. 3,756,672 granted to R. J. Comeau and D. H. Hibner on Sept. 4, 1973 and U.S. Pat. No. 30,210 granted to D. F. Buono, N. G. Carlson, D. H. Hibner and myself on Feb. 12, 1980, and assigned to the same assignee as this patent application are incorporated herein by reference.

This invention utilizes a plurality of juxtaposed plates or discs surrounding a rotating shaft supported by at least one bearing and being mounted in parallel thereto by a resilient or spring member. The plates are mounted between concentric cylinders and are alternately snug fitted on their inside and outside diameters respectively to the respective cylinders and are held in friction relationship to each other by an axial load. The energy induced by rotor unbalance is transmitted by the spring and dissipated through the friction plates. The spring restores the system to its balanced condition. The location of the damper on the bearing support causes it to absorb radial energy of the shaft without restricting shaft rotations.

DISCLOSURE OF INVENTION

An object of this invention is to provide for a rotor an improved damper.

A feature of this damper is the utilization of friction plates that are mounted in parallel with the resilient bearing support that restores the rotor and friction plates which absorb rotor unbalance, energy.

Other features and advantages will be apparent from the specification and claims and from the accompanying drawings which illustrate an embodiment of the invention.

BRIEF DESCRIPTION OF DRAWINGS

The sole FIGURE is a partial view in section illustrating the details of the invention.

BEST MODE FOR CARRYING OUT THE INVENTION

While the sole FIGURE describes a rotor for a jet engine, it is to be understood that the damper of this invention can be utilized in other rotary machines where vibrations are present.

The shaft 10 (partially shown) rotatably supported about center line 12 by roller bearing generally indicated by reference numeral 14 carries the compressors and turbines for the jet engine (not shown). For further details of a jet engine rotor reference should be made to the engine model TF-30 manufactured by Pratt & Whitney Aircraft Group of United Technologies Corporation.

The roller bearing comprises a plurality of circumferentially spaced rollers 16 sandwiched between the inner race 18 and outer race 20. The outer race 20 is supported in fixed relationship to the annular pedestal 22 which is supported to ground by the resilient or hair spring members 24. One leg of spring 24 is bolted by bolt 26 to the fixed ground member 28, and the other leg bolt 26 carries the pedestal 22. Outer cylindrical element 30 is also fixed to ground 28 via the flange 32 and bolt 26. Inner cylindrical member 34 carries flange 36 bolted to the free end of leg 38 of hair spring 24. It is noted that the outer diameter 40 of flange 36 is spaced from the adjacent grounded member 28 so that it has deflection space.

As can be seen from the sole FIGURE and according to this invention a plurality of axially spaced flat discs 42 or friction plates are pressure fitted into the spaces provided by the concentric cylinders 30 and 34. Alternate plates 42 and 42A are snugly fitted to the concentric cylindrical surfaces, so that the inner diameter of plate 42 is press fitted onto the outer diameter of cylinder 34 and the outer diameter of plate 42A is press fitted onto the inner diameter of cylinder 30. A Belleville washer 44 spring loads the plates axially and holds them with sufficient frictional relationship to absorb the desired load occasioned by the rotor unbalance.

Spacer 46 slides over the inner diameter of cylinder 30 and is held in fixed relationship by the nut 48 threaded to the outer diameter of cylinder 30.

As is apparent from the foregoing, the friction plates 42 and 42A will rub together as the bearing support deflects. Resistance to this deflection is provided by the friction force between the plates. The force normal to the rubbing surfaces necessary to produce a frictional force is provided by Belleville spring 44. The Belleville spring 44 is designed to provide constant normal force in spite of variation in the spring deflection caused by wear on friction plates or tolerance stack up of the various components.

Slots or apertures 50 are formed in an alternating pattern through the plates so that oil can migrate between plates to assure that the plates do not overheat.

It should be understood that the invention is not limited to the particular embodiments shown and described herein, but that various changes and modifications may be made without departing from the spirit and scope of this novel concept as defined by the following claims.

We claim:

1. For a rotor rotatably supported by a bearing, damper means connected to said bearing, said damper means comprising a pair of concentric cylindrical members, a plurality of axially juxtaposed plate-like elements surrounding a portion of said rotor mounted in friction relationship with each other, each plate-like element having an outer diameter and an inner diameter, means for urging alternate plate-like elements to bear against the pair of concentric rings in a pattern that includes alternate plate-like elements to engage the outer concentric cylinder an the adjacent plate-like element to engage the inner concentric cylinder and means for urging each plate against each other to control the amount of force for attaining relative movement between adjacent plates and means attached to said bearing for restoring said plates to a predetermined position when the rotor is in a balanced condition.

2. For a rotor as in claim 1 wherein said means attached to said bearing is a hair spring mounted in parallel relative to said plate-like elements.

3. For a rotor as in claim 2 including means for exerting an axial load on said plate-like elements, said means including a toroidally-shaped spring element surrounding said rotor portion adjacent one axial end of said plate-like elements and locking means for loading said toroidally shaped spring element against said plate-like elements at a given load level.

* * * * *